(12) United States Patent
Sodhi et al.

(10) Patent No.: US 9,395,784 B2
(45) Date of Patent: Jul. 19, 2016

(54) INDEPENDENTLY CONTROLLING FREQUENCY OF PLURALITY OF POWER DOMAINS IN A PROCESSOR SYSTEM

(71) Applicant: Intel Corporation, Santa Clara, CA (US)

(72) Inventors: Inder Sodhi, Folsom, CA (US); Sanjeev Jahagirdar, Folsom, CA (US); Ryan Wells, Folsom, CA (US); Zeev Offen, Folsom, CA (US); Shalini Sharma, Folsom, CA (US); Ken Drottar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 13/870,195

(22) Filed: Apr. 25, 2013

(65) Prior Publication Data

US 2014/0325247 A1 Oct. 30, 2014

(51) Int. Cl.
*G06F 1/32* (2006.01)
*G06F 1/26* (2006.01)

(52) U.S. Cl.
CPC .. *G06F 1/32* (2013.01); *G06F 1/26* (2013.01); *G06F 1/3243* (2013.01); *Y02B 60/1239* (2013.01)

(58) Field of Classification Search
CPC ... G06F 1/3203; G06F 1/3268; G06F 1/3271; G06F 1/3275
See application file for complete search history.

(56) References Cited

U.S. PATENT DOCUMENTS

| | | | |
|---|---|---|---|
| 5,163,153 A | 11/1992 | Cole et al. | |
| 5,201,059 A * | 4/1993 | Nguyen | 713/323 |
| 5,218,704 A * | 6/1993 | Watts et al. | 713/322 |
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,167,993 B1 * | 1/2007 | Thomas et al. | 713/322 |

(Continued)

FOREIGN PATENT DOCUMENTS

EP 1 282 030 A1 5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Chun Cao
*Assistant Examiner* — Santosh R Poudel
(74) *Attorney, Agent, or Firm* — Trop, Pruner & Hu, P.C.

(57) ABSTRACT

In an embodiment, a processor includes a core to execute instructions, an agent to perform an operation independently of the core, a fabric to couple the core and agent and including a plurality of domains and a logic to receive isochronous parameter information from the agent and environmental information of a platform and to generate first and second values, and a power controller to control a frequency of the domains based at least in part on the first and second values. Other embodiments are described and claimed.

20 Claims, 12 Drawing Sheets

(56) References Cited

U.S. PATENT DOCUMENTS

| | | | |
|---|---|---|---|
| 7,194,643 | B2 | 3/2007 | Gonzalez et al. |
| 7,272,730 | B1 | 9/2007 | Acquaviva et al. |
| 7,412,615 | B2 | 8/2008 | Yokota et al. |
| 7,434,073 | B2 | 10/2008 | Magklis |
| 7,437,270 | B2 | 10/2008 | Song et al. |
| 7,454,632 | B2 | 11/2008 | Kardach et al. |
| 7,529,956 | B2 | 5/2009 | Stufflebeam |
| 7,539,885 | B2 | 5/2009 | Ma |
| 7,730,340 | B2 | 6/2010 | Hu et al. |
| 7,870,413 | B2 * | 1/2011 | Jong ............... G06F 1/12 713/500 |
| 7,971,087 | B2 * | 6/2011 | Khodorkovsky ............ 713/500 |
| 8,694,811 | B2 * | 4/2014 | Raju et al. ............... 713/320 |
| 2001/0044909 | A1 | 11/2001 | Oh et al. |
| 2002/0194509 | A1 | 12/2002 | Plante et al. |
| 2003/0061383 | A1 | 3/2003 | Zilka |
| 2004/0064752 | A1 | 4/2004 | Kazachinsky et al. |
| 2004/0098560 | A1 | 5/2004 | Storvik et al. |
| 2004/0139356 | A1 | 7/2004 | Ma |
| 2004/0268166 | A1 | 12/2004 | Farkas et al. |
| 2005/0022038 | A1 | 1/2005 | Kaushik et al. |
| 2005/0033881 | A1 | 2/2005 | Yao |
| 2005/0132238 | A1 | 6/2005 | Nanja |
| 2005/0204175 | A1 * | 9/2005 | Burton ............... 713/300 |
| 2006/0031692 | A1 * | 2/2006 | Kato et al. ............... 713/300 |
| 2006/0031835 | A1 * | 2/2006 | Day et al. ............... 718/100 |
| 2006/0050670 | A1 | 3/2006 | Hillyard et al. |
| 2006/0053326 | A1 | 3/2006 | Naveh |
| 2006/0059286 | A1 | 3/2006 | Bertone et al. |
| 2006/0069936 | A1 | 3/2006 | Lint et al. |
| 2006/0117202 | A1 | 6/2006 | Magklis et al. |
| 2006/0184287 | A1 | 8/2006 | Belady et al. |
| 2007/0005995 | A1 | 1/2007 | Kardach et al. |
| 2007/0016817 | A1 | 1/2007 | Albonesi et al. |
| 2007/0079294 | A1 | 4/2007 | Knight |
| 2007/0103836 | A1 * | 5/2007 | Oh ............... 361/115 |
| 2007/0106827 | A1 | 5/2007 | Boatright et al. |
| 2007/0118774 | A1 * | 5/2007 | Thomas et al. ............... 713/300 |
| 2007/0156992 | A1 | 7/2007 | Jahagirdar |
| 2007/0214342 | A1 | 9/2007 | Newburn |
| 2007/0239398 | A1 | 10/2007 | Song et al. |
| 2007/0240003 | A1 * | 10/2007 | Watts, Jr. ............... 713/322 |
| 2007/0245163 | A1 | 10/2007 | Lu et al. |
| 2007/0250729 | A1 * | 10/2007 | Thomas et al. ............... 713/322 |
| 2008/0022140 | A1 * | 1/2008 | Yamada et al. ............... 713/322 |
| 2008/0028240 | A1 | 1/2008 | Arai et al. |
| 2008/0049009 | A1 * | 2/2008 | Khodorkovsky ............ 345/211 |
| 2008/0250260 | A1 | 10/2008 | Tomita |
| 2008/0313483 | A1 * | 12/2008 | Pasupuleti Sureshbabu . 713/330 |
| 2009/0006871 | A1 | 1/2009 | Liu et al. |
| 2009/0150695 | A1 | 6/2009 | Song et al. |
| 2009/0150696 | A1 | 6/2009 | Song et al. |
| 2009/0158061 | A1 * | 6/2009 | Schmitz et al. ............... 713/300 |
| 2009/0158067 | A1 | 6/2009 | Bodas et al. |
| 2009/0172375 | A1 | 7/2009 | Rotem et al. |
| 2009/0172428 | A1 | 7/2009 | Lee |
| 2009/0235105 | A1 | 9/2009 | Branover et al. |
| 2009/0249089 | A1 * | 10/2009 | Tremel et al. ............... 713/300 |
| 2010/0115309 | A1 | 5/2010 | Carvalho et al. |
| 2010/0146513 | A1 | 6/2010 | Song |
| 2010/0191997 | A1 | 7/2010 | Dodeja et al. |
| 2010/0250981 | A1 * | 9/2010 | Pamley et al. ............... 713/320 |
| 2011/0010567 | A1 * | 1/2011 | Schmitz et al. ............... 713/300 |
| 2011/0154090 | A1 | 6/2011 | Dixon et al. |
| 2011/0252251 | A1 * | 10/2011 | de Cesare et al. ............ 713/320 |
| 2012/0079290 | A1 | 3/2012 | Kumar |
| 2012/0246506 | A1 | 9/2012 | Knight |
| 2013/0061064 | A1 * | 3/2013 | Ananthakrishnan ...... G06F 1/26 713/300 |
| 2013/0073878 | A1 * | 3/2013 | Jayasimha ............ G06F 1/3287 713/300 |
| 2014/0149732 | A1 * | 5/2014 | Sanner, III ............ G06F 9/4405 713/2 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a Gals Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/247,564, filed Sep. 28, 2011, entitled, "Estimating Temperature of a Processor Core in a Low Power State", by Avinash N. Ananthakrishnan, et al.

U.S. Appl. No. 13/282,896, filed Oct. 27, 2011, entitled, "Enabling a Non-Core Domain to Control Memory Bandwidth", by Avinash N. Ananthakrishnan, et al.

U.S. Appl. No. 13/282,947, filed Oct. 27, 2011, entitled, "Controlling Operating Frequency of a Core Domain Via a Non-Core Domain of a Multi-Domain Processor", by Avinash N. Ananthakrishnan, et al.

U.S. Appl. No. 13/285,414, filed Oct. 31, 2011, entitled, "Controlling a Turbo Mode Frequency of a Processor," by Avinash N. Ananthakrishnan, et al.

U.S. Appl. No. 13/247,580, filed Sep. 28, 2011, entitled, "Controlling Temperature of Multiple Domains of a Multi-Domain Processor," by Avinash N. Ananthakrishnan, et al.

U.S. Appl. No. 13/285,465, filed Oct. 31, 2011, entitled, "Dynamically Controlling Cache Size to Maximize Energy Efficiency," by Avinash N. Ananthakrishnan, et al.

U.S. Appl. No. 13/225,677, filed Sep. 6, 2011, entitled, "Dynamically Allocating a Power Budget Over Multiple Domains of a Processor," by Avinash N. Ananthakrishnan, et al.

U.S. Appl. No. 13/600,568, filed Aug. 31, 2012, entitled, "Configuring Power Management Functionality in a Processor," by Malini K. Bhandaru, et al.

U.S. Appl. No. 13/793,037, filed Mar. 11, 2013, entitled, "Controlling Operating Voltage of a Processor," by Ryan D. Wells, et al.

* cited by examiner

INDEPENDENTLY CONTROLLING FREQUENCY OF PLURALITY OF POWER DOMAINS IN A PROCESSOR SYSTEM

FIELD OF INVENTION

Embodiments relate to power management of a system, and more particularly to power management of non-compute portions of a processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

Some available processors are implemented with dynamic voltage and frequency scaling (DVFS) for their compute engines (namely processor cores). However, such processors maintain interface components such as a communication fabric that includes non-core components at a fixed voltage/frequency (V/F) based on a performance design of a system. In fact, in current system designs, the fabric is typically designed for the maximum performance point and kept at a fixed V/F. This limits the power savings abilities of a processor.

DETAILED DESCRIPTION

In various embodiments, a processor may include interface circuitry such as a communication fabric to interconnect different components of the processor. To reduce power consumption based on an operating workload and platform-based environmental conditions, embodiments enable the fabric, also referred to herein as a system agent, to operate at a dynamic voltage and/or frequency (hereafter V/F). This dynamic control can be extended to multiple independent domains of the system agent. That is, in some embodiments the system agent may be configured with multiple independent domains, each to couple to different components of the processor or platform, and which may operate at a dynamic and independent voltage and/or frequency. Embodiments may scale performance and reduce overall power by using bandwidth demand and heuristics-based fabric DVFS.

Embodiments thus enable the system agent or other processor logic to monitor demand from several components, to determine the optimal operating point for the fabric. Various heuristics and other information such as from different processor counters may be used to track the behavior of the system to determine the optimal point. Prior to effecting a frequency and/or voltage change, agents that interface with the system agent may be decoupled from the fabric. Thereafter operating frequencies and/or voltages for the fabric may be re-programmed and then the agents may be re-coupled.

Embodiments may further collect metrics from various agents of the processor and system to track performance needs and bandwidth demand. Heuristics and control logic may in turn determine whether there are any system constraints that would prevent a transition at this point. If not, a work point-based ratio change technique may be used to provide a new set of parameters to be re-programmed in various components of the system agent, including clock crossing buffers that couple the fabric to other system components.

Figure 1:
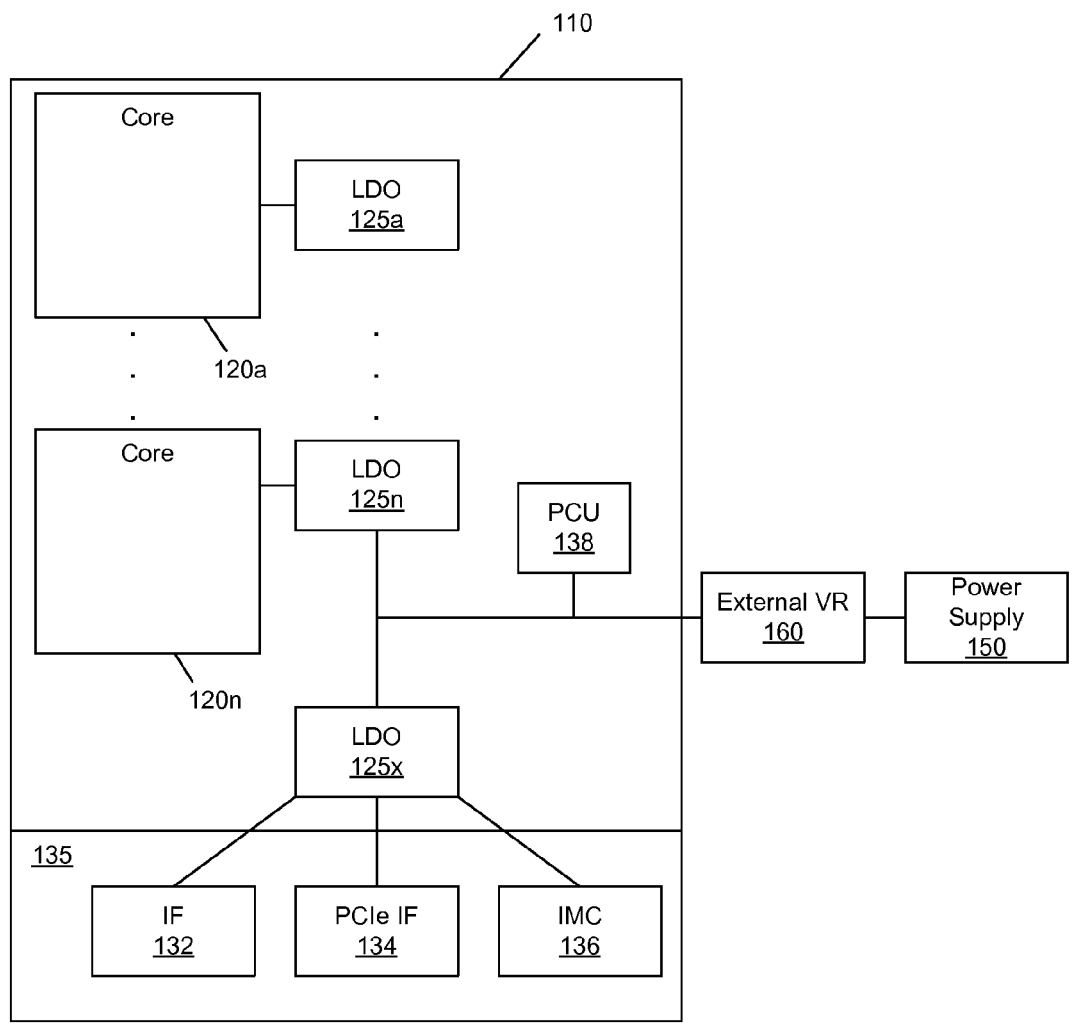
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor socket including multiple core units 120a-120n. In an embodiment, each core unit may include multiple cores, a cache memory, an interface unit and so forth. In addition, each core unit may be associated with an individual low dropout regulator (LDO) 125a-125n to allow for fine-grained control of voltage and thus power and performance of each individual core unit. As such, each core can operate at an independent voltage and frequency, enabling great flexibility and affording wide opportunities for balancing power consumption with performance. Note that in other embodiments, different types of voltage regulators may be present on the die.

Still referring to FIG. 1, additional components, which may generally constitute a system agent, or fabric 135, may be present within the processor including an input/output interface 132, another interface 134, and an integrated memory controller 136. Each of these additional components may be powered by another LDO 125x. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Fabric 135 may include multiple domains each that can operate at independent voltage and frequency levels. To this end, using an embodiment of the present invention, logic within fabric 135 may analyze various information and based on the analyzed information, heuristics and other information, dynamically control a voltage/frequency of one or more of these independent domains.

Also shown is a power control unit (PCU) 138, which may include hardware, software and/or firmware to perform power management operations with regard to processor 110. In general, PCU 138 may perform power management operations for the processor based on information received from various sources. In an embodiment, these sources include instructions from system software (such as an OS, basic input/output system (BIOS) or application software), configuration information, e.g., received from configuration storages of the processor such as one or more non-volatile storages, fuses or the like, among other information. Although not illustrated as such, in some embodiments PCU 138 may be implemented within fabric 135. In some embodiments, PCU 138 may include logic to enable dynamic control of voltage/frequency of multiple independent domains of the fabric in accordance with an embodiment of the present invention. Furthermore, PCU 138 may be coupled via a dedicated interface to external voltage regulator 160. In this way, PCU 138 can instruct the voltage regulator to provide a requested regulated voltage to the processor. While not shown for ease of illustration, understand that additional components may be present within processor 110 such as additional uncore logic and other components such as internal memories, e.g., one or more levels of a cache memory hierarchy and so forth.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the dynamic voltage/frequency control of a system agent or other fabric described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency, exceeding to a maximum peak frequency of the particular processor, as fused or otherwise written into the processor during manufacture. In addition, according to ACPI, a processor can operate at various power states or levels. With regard to power states, ACPI specifies different activity or power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 2:
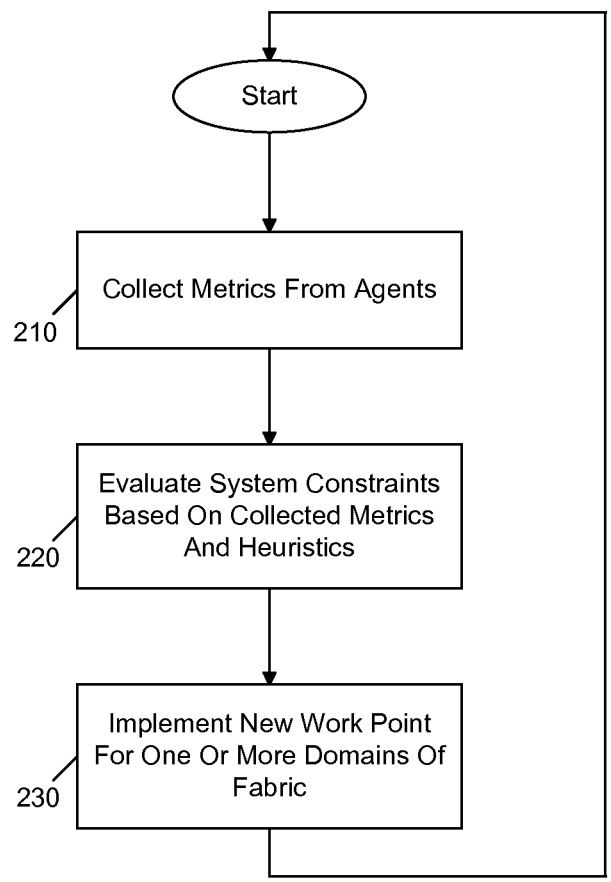
FIG. 2 is a flow diagram of a high level method for dynamically controlling voltage/frequency of one or more independent domains of a fabric in accordance with an embodiment of the present invention.

Referring now to FIG. 2, shown is a flow diagram of a high level method for dynamically controlling voltage/frequency of one or more independent domains of a fabric in accordance with an embodiment of the present invention. As shown in FIG. 2, method 200 may be performed by control logic that can be implemented by appropriate combinations of hardware, software and/or firmware. In some embodiments, dedicated logic within the fabric may be used to perform method 200. However understand the scope of the present invention is not limited in this regard and in other implementations other processor circuitry may be involved. As one particular example, method 200 may be implemented within microcode of a power controller such as a PCU of a processor. In one particular embodiment, method 200 may be executed according to a predetermined operating cycle. As one such example, method 200 may execute between approximately every 1 and 100 milliseconds (ms).

As seen in FIG. 2, method 200 begins by collecting metrics from one or more agents (block 210). More specifically, various processor agents, including one or more cores, other agents such as peripheral devices, accelerators, third party intellectual property (IP) blocks, memory controller circuitry, and so forth each may provide various metrics regarding their operating parameters. Based on these collected metrics and various heuristics, system constraints may be evaluated (block 220). As examples, the system constraints may indicate whether a system is thermally constrained, bandwidth constrained, power constrained or another such constraint on operation of the system. Based on these resulting system constraints, one or more domains of the fabric can have an operating point adjusted. More specifically, at block 230 a new work point may be implemented for one or more domains of the fabric. Details regarding the operations performed in implementing a new work point will be discussed further below. Although shown at this high level in the embodiment of FIG. 2, understand the scope of the present invention is not limited in this regard.

Figure 3:
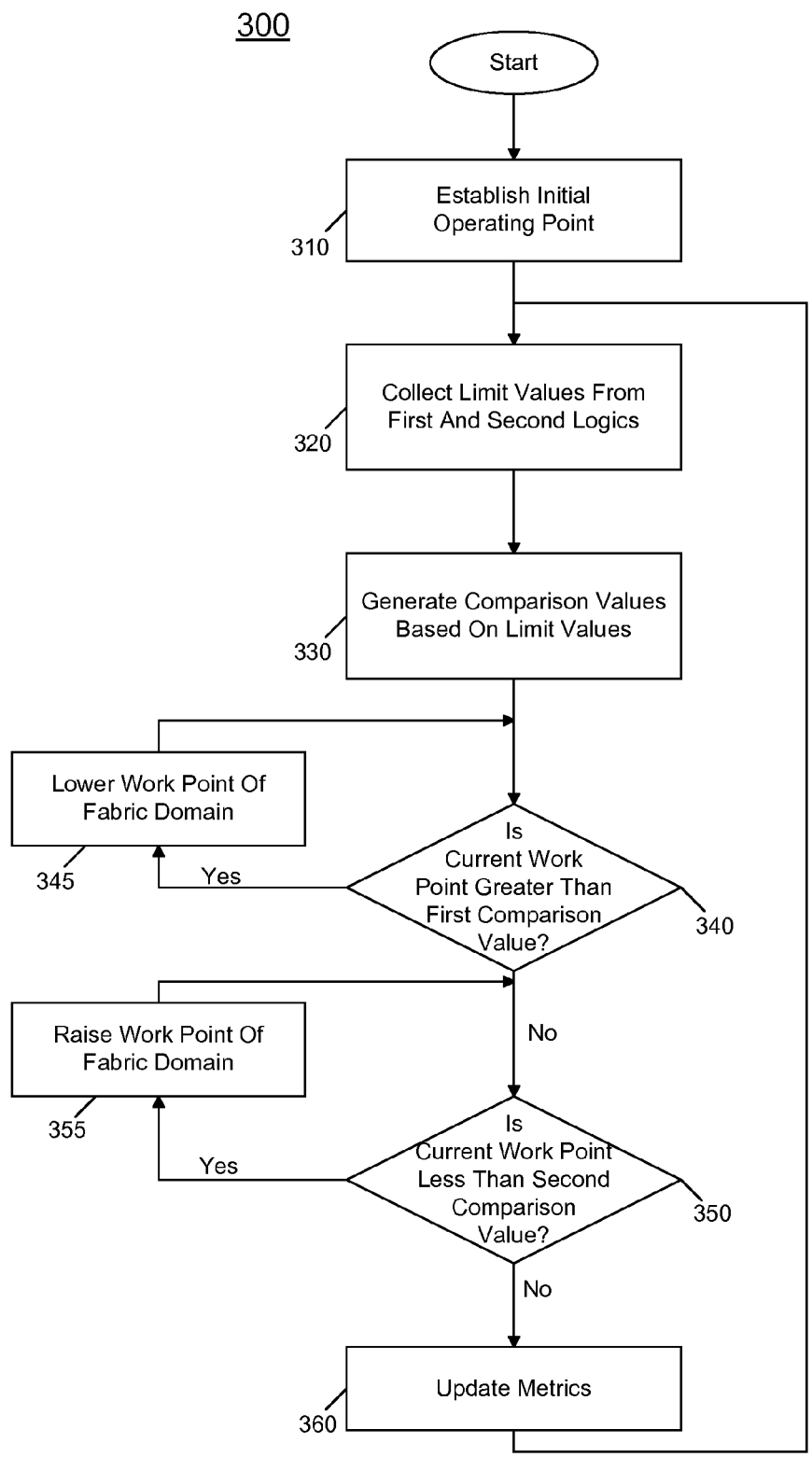
FIG. 3 is a flow diagram of a method for controlling operating voltage of a processor in accordance with an embodiment of the present invention.
Figure 5:
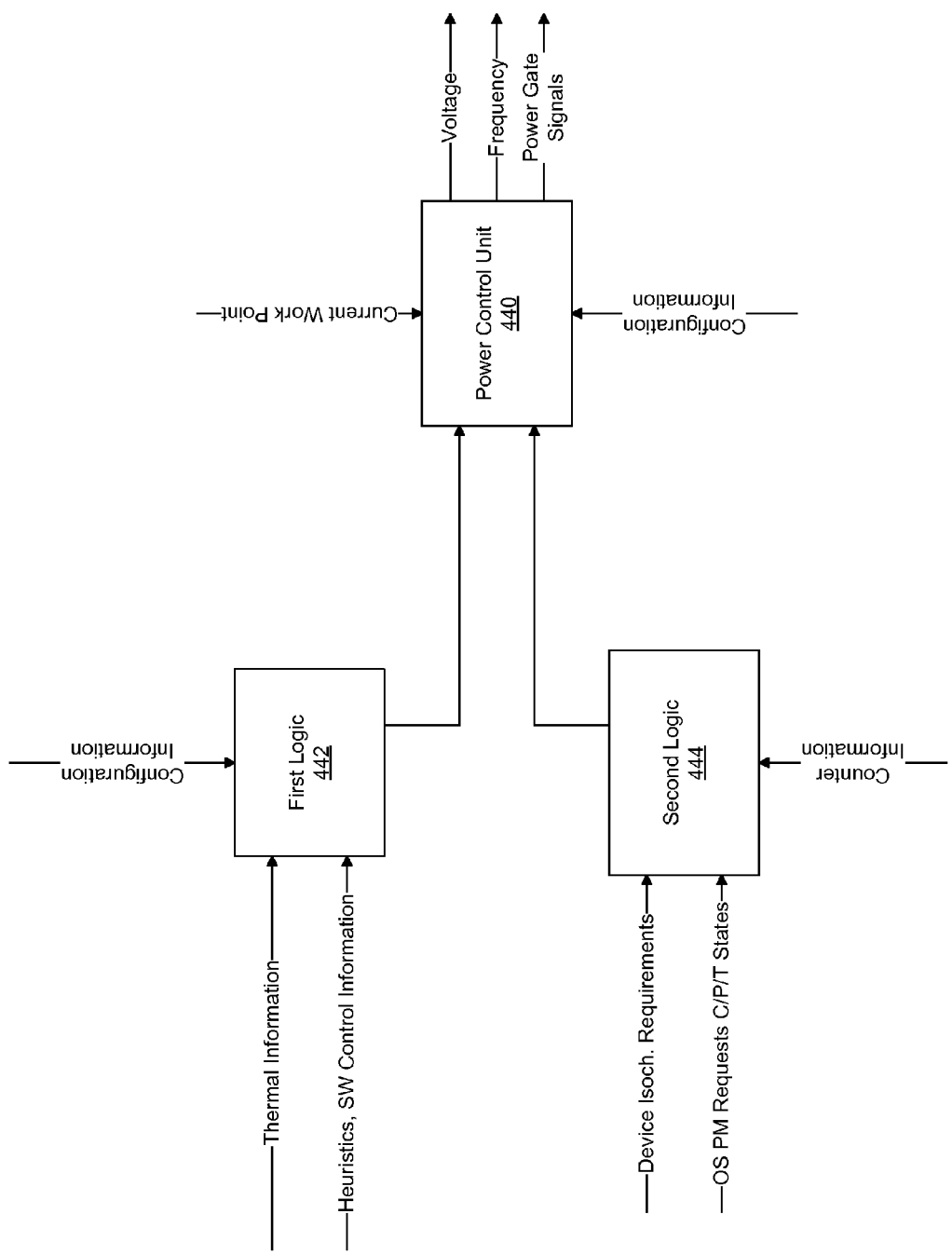
FIG. 5 is a block diagram of a portion of power control circuitry in accordance with an embodiment of the present invention.

Referring now to FIG. 3, shown is a flow diagram of a more detailed method for controlling voltage/frequency of independent domains of a fabric in accordance with an embodiment of the present invention. As shown in FIG. 3, method 300 may similarly be performed by an appropriate control logic as discussed above. Method 300 begins on reset of a system, which causes control to pass to block 310 where initial operating points for the multiple fabric domains may be established. In an embodiment, various configuration information may be received on system reset to establish these initial operating points. As an example, this configuration information may be received from boot code such as BIOS or OS configuration information. As one such example, the configuration information may provide an initial voltage and frequency value for each independent domain of the fabric. Control next passes to block 320 where limit values may be collected from multiple independent logics. As will be described further below multiple logics may be present each of which is used to provide multiple limit values based on various metric information that is sampled and processed at different speeds, as shown in FIG. 5 below. For example, a first logic may be used to analyze information according to relatively slowly changing metrics and generate first limit values (e.g., low and high). In turn, a second logic may be used to analyze information according to relatively fast changing metrics and generate second limit values (e.g., low and high).

Still referring to FIG. 3, control next passes to block 330 where comparison values may be generated based on the limit values. In an implementation in which the limit values correspond to frequency (limited due to voltage, power, or temperature) a first comparison value may correspond to a high value and may be the maximum of the high limit values from the multiple logics. In turn, a second comparison value may correspond to a low value and may be the minimum of the low limit values from the multiple logics. Control next passes to diamond 340 where it can be determined whether a current work point for a given domain is greater than the first comparison value. If so, control passes to block 345 where the work point for the domain can be lowered. In an embodiment, this lowering of the work point may include a reduction in the operating frequency as well as a reduction in operating voltage. In one such embodiment the operating frequency may be reduced before reducing the voltage. Details regarding the operations performed in connection with work point changes are described below.

If instead at diamond 340 the determination is in the negative, control passes to diamond 350 where it may be determined whether the current work point for a given domain is less than the second comparison value. If so, control passes to block 355 where the work point for the domain can be raised. In an embodiment, this work point raising may include an increase in the operating frequency and operating voltage. Finally, from diamond 350 control passes to block 360 where normal operation may proceed and the various metrics that are analyzed by the different logics may be updated during normal operation.

Method 300 thus operates to configure the system agent work point between the low and high operating points as determined by the two independent routines (slow and fast) running at two different time scales. The slow routine may be used to manage platform level and system thermal metrics and ensure that the system behavior is not erratic and provides a good overall user experience. The fast routine responds to immediate events to ensure that the system does not fall into a catastrophic thermal limiting zone, which would degrade overall system response and behavior. Although shown at this high level in the embodiment of FIG. 3, understand the scope of the present invention is not limited in this regard.

Figure 4:
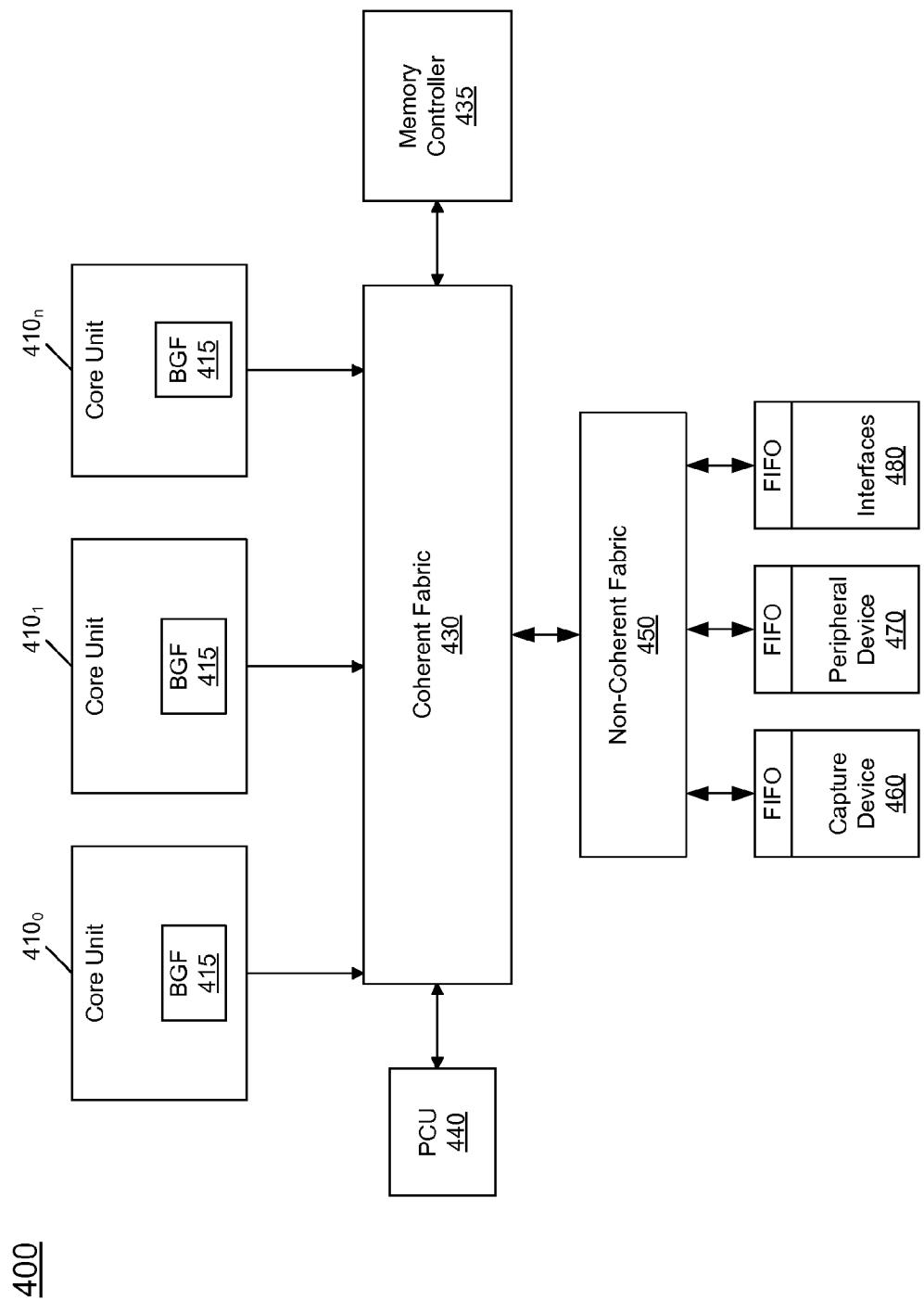
FIG. 4 is a block diagram of a processor in accordance with an embodiment of the present invention.

Embodiments can be implemented in processors for various markets including server processors, desktop processors, mobile processors and so forth. Referring now to FIG. 4, shown is a block diagram of a block diagram of a processor in accordance with an embodiment of the present invention. In the embodiment of FIG. 4, processor 400 may be a system on a chip (SoC) including multiple domains, each of which may be coupled to receive an operating voltage from a separate rail coupled to one or more external voltage regulators. Such SoC may be used in a low power system such as a smartphone, tablet computer, Ultrabook™ or other portable computing device. In addition, although not shown for ease of illustration in FIG. 4, understand that the voltage rails may in turn be coupled to on-chip LDOs that may further condition a regulated voltage to be provided to corresponding logic of the SoC.

In the high level view shown in FIG. 4, processor 400 includes a plurality of core units $410_0$-$410_n$. Each core unit may include one or more processor cores. In addition, each such core may be coupled to a cache memory which in an embodiment may be a shared level (L2) cache memory. As further shown, each core unit 410 includes a clock interface 415, which may be implemented as a bubble generator first in first out (BGF) clock crossing buffer to enable interconnection to a coherent fabric 430 that may act as a primary cache coherent on-die interconnect that in turn couples to a memory controller 435. In turn, memory controller 435 controls communications with a memory such as a dynamic random access memory (DRAM) (not shown for ease of illustration in FIG. 4).

In addition to core units, additional processing engines are present within the processor, including at least one graphics unit (not shown for ease of illustration) which may include one or more graphics processing units (GPUs) to perform graphics processing as well as to possibly execute general purpose operations on the graphics processor (so-called GPGPU operation). In addition, at least one image signal processor (not shown for ease of illustration) may be present to process incoming image data received from one or more capture devices, either internal to the SoC or off-chip. All of these various processing units, including core units 410, and any graphics unit and image signal processor couple to coherent fabric 430.

Each of the units may have its power consumption controlled via a power control unit 440. In an embodiment, PCU 440 may further perform at least portions of the fabric DVFS described herein. For example, control logic within coherent fabric 430 may provide limit values to the PCU for use in such DVFS operations.

As further seen in FIG. 4, coherent fabric 430 couples to a non-coherent fabric 450 (also referred to herein as an IO subsystem) to which various peripheral devices may couple.

In the embodiment shown in FIG. 4, these devices include a capture device 460 such as an on-chip camera, one or more peripheral devices 470, and one or more interfaces 480 such as a PCIe™ interface to enable communication with one or more offchip devices, e.g., according to the PCIe™ communication protocol. As seen, each of the devices couples to non-coherent fabric 450 via a FIFO. Although shown at this high level in the embodiment of FIG. 4, understand the scope of the present invention is not limited in this regard.

Referring now to FIG. 5, shown is a block diagram of a portion of power control circuitry in accordance with an embodiment of the present invention. As shown in FIG. 5, the circuitry includes PCU 440, as discussed above. In addition, a first logic 442 and a second logic 444 are present. In various embodiments, first logic 442 may include control logic to perform analysis of incoming slow moving information and generate first limit values to provide to PCU 440. In the embodiment shown, this incoming information provided to first logic 442 includes information from an embedded controller including thermal information, and various heuristics including configuration information such as received from user-controlled software knobs. In addition, additional configuration information such as a given mode of operation (e.g., performance, power saving or so forth) may be received from system software such as an appropriate driver. In an embodiment, first logic 442 may execute a slow-moving limit routine that sample counters at a relatively slow rate (e.g., @1 ms) and averages them for a first predetermined time (e.g., 100 ms) to generate slow (e.g., thermals, battery Icc) high and low limits for the SA work points. Each of these limits can be a result of a limit computed based on several internal limits in the algorithm, including techniques to enable/disable particular limitations based on software overrides.

In turn, second logic 444 may include control logic to perform analysis of incoming fast moving information and generate second limit values to provide to PCU 440. Such fast moving information includes device isochronous requirements which may be received from one or more agents of the processor to indicate deadline values for data requests and power management requests such as received from an OS power management system. Such requests may include requests for so-called C-states or P-states for various components of the processor. In addition, the fast moving information further includes counter information including stall cycle counts which may be received from one or more cores or other agents of the processor and bandwidth counters such as bandwidth counters associated with a memory coupled to the processor. Second logic 444 may execute a fast moving limit routine that evaluates the current system constraints by sampling counters at a relatively high rate (e.g., @100 microseconds (us)) and averages them for a second predetermined time (e.g., 1 ms) to generate fast (e.g., performance, bandwidth (BW) based) high and low limits for the SA work points, in an embodiment.

Still referring to FIG. 5, PCU 440 receives these incoming limit values and additional information and based on all of the inputs generates control signals to update voltage/frequency of one or more domains of the fabric. In addition, PCU 440 may further generate control signals to control gating of other processor agents to effect such voltage/frequency transitions. More specifically, PCU 440 receives various configuration information such as configuration values for voltage and frequency, e.g., as received from processor fuses or other non-volatile storages. In addition, PCU 440 receives a current work point. In an embodiment, this work point may correspond to a current voltage/frequency combination for each independent domain of the system agent. In turn, PCU 440 may execute a control routine that takes these limits and sequences the appropriate actions in hardware to transition to the new SA work points. Responsive to all this information, PCU 440 generates voltage control signals provided to appropriate voltage regulators (e.g., as so-called voltage ID (VID) signals) to cause the voltage regulator to generate an appropriate voltage. PCU 440 may further generate a frequency value that can be provided to each of the independent domains of the system agent and power gate signals to power gate various agents coupled to the system agent to enable the change to be effected.

To determine the optimal operating point, the control logic analyzes multiple domains using various counters and metrics (e.g., compute engine frequency request, bandwidth throughput/stall counters, latency tolerance messaging, device isochronous requirements) to determine the optimal frequency for the fabric domains. In addition, since multiple domains may use the same voltage domain and have different design target parameters, embodiments may enable optimizations of the design at various points and then perform a scenario-based selection for the optimal operating point to satisfy the performance needs for that domain based on system constraints.

Figure 6A:
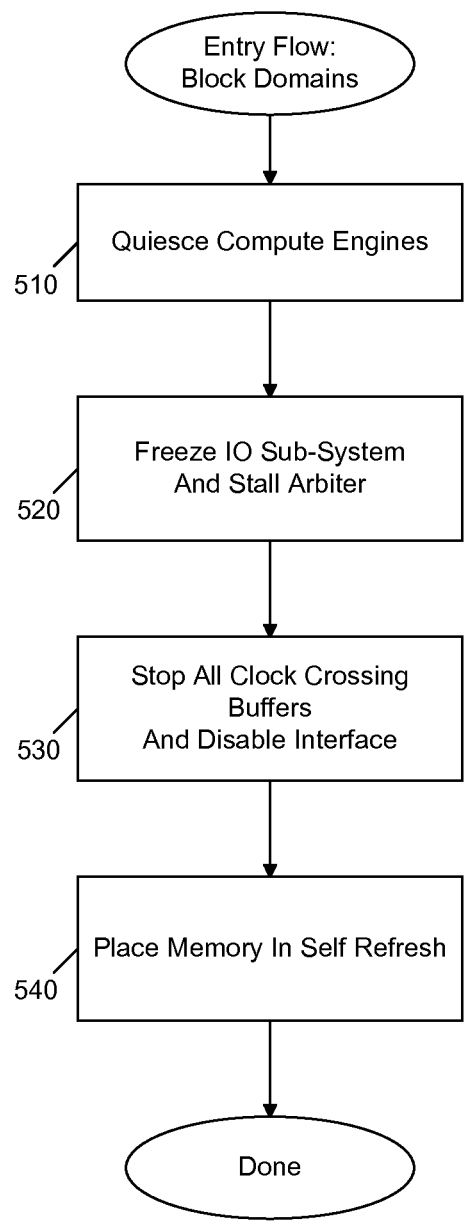
FIG. 6A is a flow diagram of a method for performing operations in preparation for a voltage/frequency change to one or more domains of a fabric in accordance with an embodiment of the present invention.

As seen in FIG. 6A shown is a flow diagram of a method 500 for performing operations in preparation for a voltage/frequency change to one or more domains of a fabric. As seen, at block 510 the compute engines may be quiesced. After quiescing the compute cores, none of the compute agents are generating transactions to memory and have completed all outstanding transactions, but the path to the coherent fabric (caches, etc.) is open for snoops from the IO subsystem. Then at block 520, an IO subsystem of the system agent may be frozen. Note that this freezing of the IO subsystem may further include stalling an arbiter that performs arbitration with regard to downstream agents. When the IO subsystem interface is closed none of the agents can generate upstream traffic. Also any IO traffic to memory is shut down and outstanding transactions are completed. The device agents are in a loop, waiting to get a valid slot. Next at block 530 all BGFs may be stopped and their interfaces disabled such that no communication of transactions occurs between the various agents coupled to the fabric via these clock crossing buffers. As a part of stopping the BGFs, each agent in the primary fabric is requested to enter a safe point in which all serial BGFs are stopped and drained and the sideband interface is cleaned. Finally, at block 540 a memory coupled to the fabric may be placed into a self refresh mode. Accordingly, at this point, all associated agents are in an appropriate state to enable the PCU to cause the indicated voltage/frequency transition while these components remain at a safe point. Although shown at this high level in the embodiment of FIG. 6A, understand the scope of the present invention is not limited in this regard.

In general, the operation of FIG. 6A enables devices coupled to the fabric to be placed into a safe point before the fabric performs V/F changes. Note that updating the operating frequency of the clock crossing FIFOs may reduce transition latency. That is, use of synchronizers and alignment logic to perform such transitions may be avoided, enabling a reduced transition latency by providing asynchronous FIFOs and post-PLL clock dividers to perform transitions faster and with reduced downtime, instead of PLL relocking.

Figure 6B:
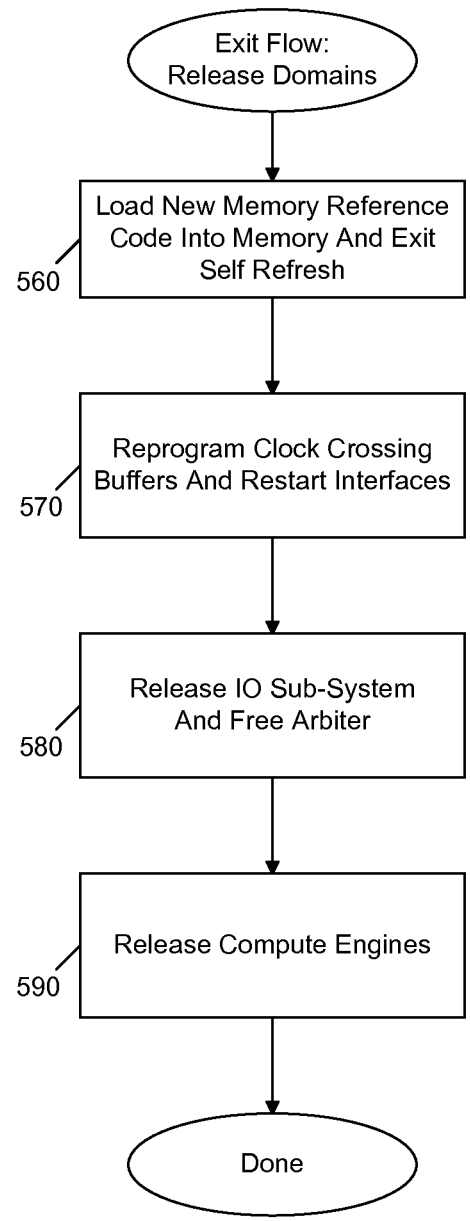
FIG. 6B is a flow diagram of a method of operations performed after performing a voltage/frequency change to one or more domains of a fabric in accordance with an embodiment of the present invention.

Referring now to FIG. 6B, shown is a flow diagram of a method of operations performed after performing a voltage/frequency change to one or more domains of the system agent. As shown in FIG. 6B, method 550 begins by loading a new memory reference code into the memory and enabling the memory to exit the self refresh state (block 560). Next, control passes to block 570 where the BGFs can be reprogrammed. More specifically, the interface of each BGF can be reprogrammed to correspond to the updated frequency of the associated system agent domain. In addition at block 570 the interfaces may be restarted. Control next passes to block 580 where the IO subsystem may be released and the arbiter may be freed to continue performing arbitrations to allow transactions to be communicated with the fabric. Finally, at block 590 the compute engines may be released such that traffic may be communicated between the system agent and the compute engines.

Many systems incorporate a large guard band in the power delivery design to ensure that the system does not fail during operation at maximum current (Icc Max (virus)) conditions, even at low performance levels. Maximum current (Icc max) is a function of battery charge and platform thermals. Using fabric DVFS as described herein, battery power delivery and Icc Max may be managed at different platform thermals. By using fabric DVFS, overall processor power can be regulated below the maximum Icc to prevent catastrophic events.

Embodiments may monitor demand and available resources from several components, both internal and external to the processor, to determine the optimal operating point for the fabric. A heuristics routine evaluates system constraints (e.g., battery charge level, thermal profile of the system, isochronous traffic requirements, etc.) to determine the operating point for the fabric.

Figure 7:
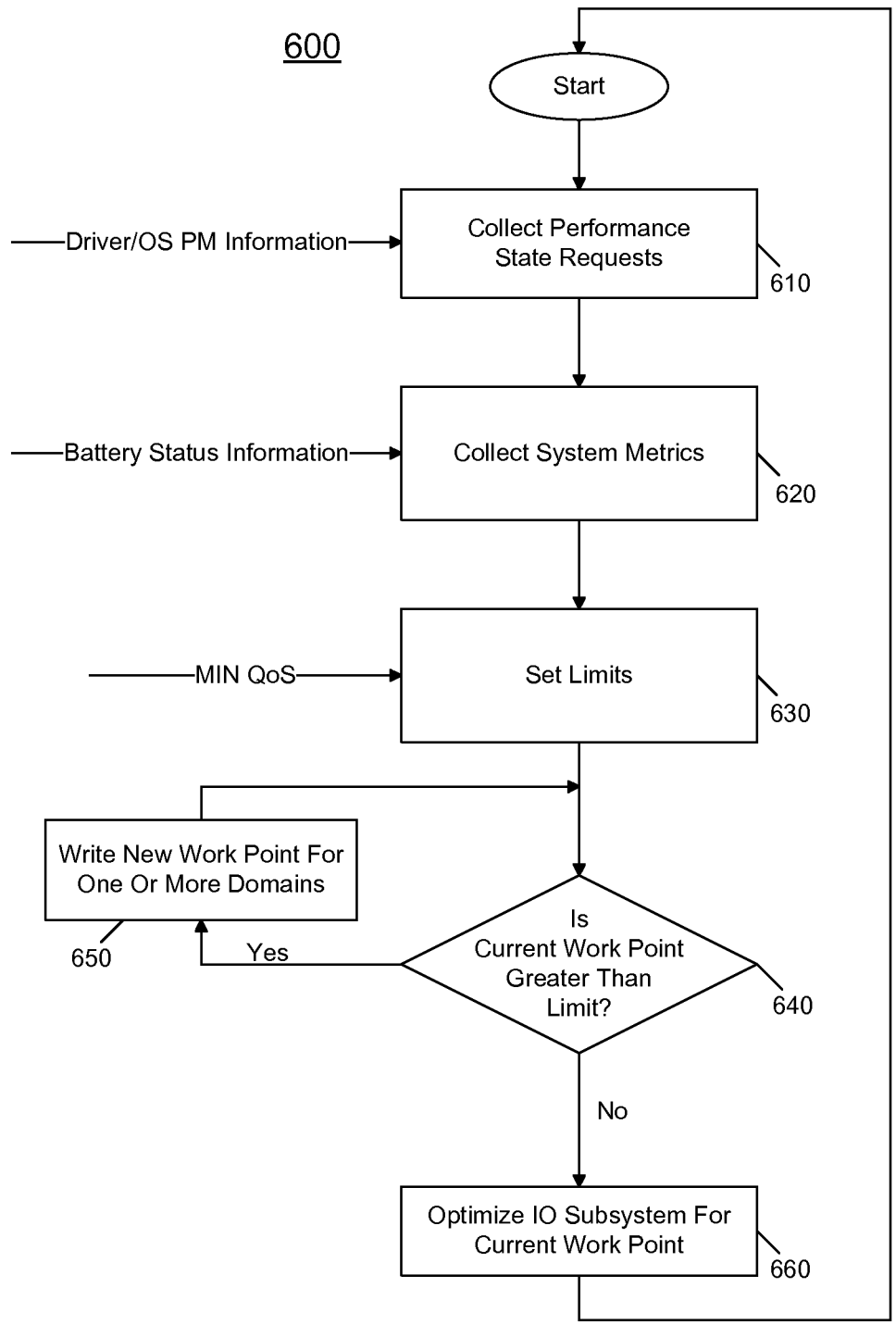
FIG. 7 is a flow diagram of a method for optimizing voltage/frequency of one or more system agent domains based on collected information in accordance with an embodiment of the present invention.

Referring now to FIG. 7, shown is a flow diagram of a method for optimizing voltage/frequency of one or more system agent domains based on collected information. More specifically as seen in FIG. 7, method 600 begins by collecting performance state requests (block 610). In an embodiment, such performance state requests may be received from various software drivers and/or an OS power management system such as ACPI. As discussed above, these performance requests may be requests to enter into and/or exit from particular performance states of a processor. Next at block 620 system metrics may be collected. Although the scope of the present invention is not limited in this regard in an embodiment such system metrics may include battery status information along with other status information received from a power management controller of a platform. In an embodiment the platform controller may be a power management integrated circuit (PMIC), which is a separate integrated circuit in a platform from the processor and its included PCU or other power controller.

Still referring to FIG. 7, based on all of this information and additional information, e.g., as received from an OS regarding minimum quality of service (QoS) requirements, various limits may be set (block 630). In an embodiment, these limits may correspond to a limit voltage/frequency for each independent domain of the system agent. Next, control passes to diamond 640 where it can be determined whether the current work point is greater than this set limit. If so, control passes to block 650 where a new work point may be written for one or more domains. Note that if the determination at diamond 640 is in the negative, control passes to block 660 where the IO subsystem may be optimized for the current work point, as described further below. Although shown at this high level in the embodiment of FIG. 7, understand the scope of the present invention is not limited in this regard.

Figure 8:
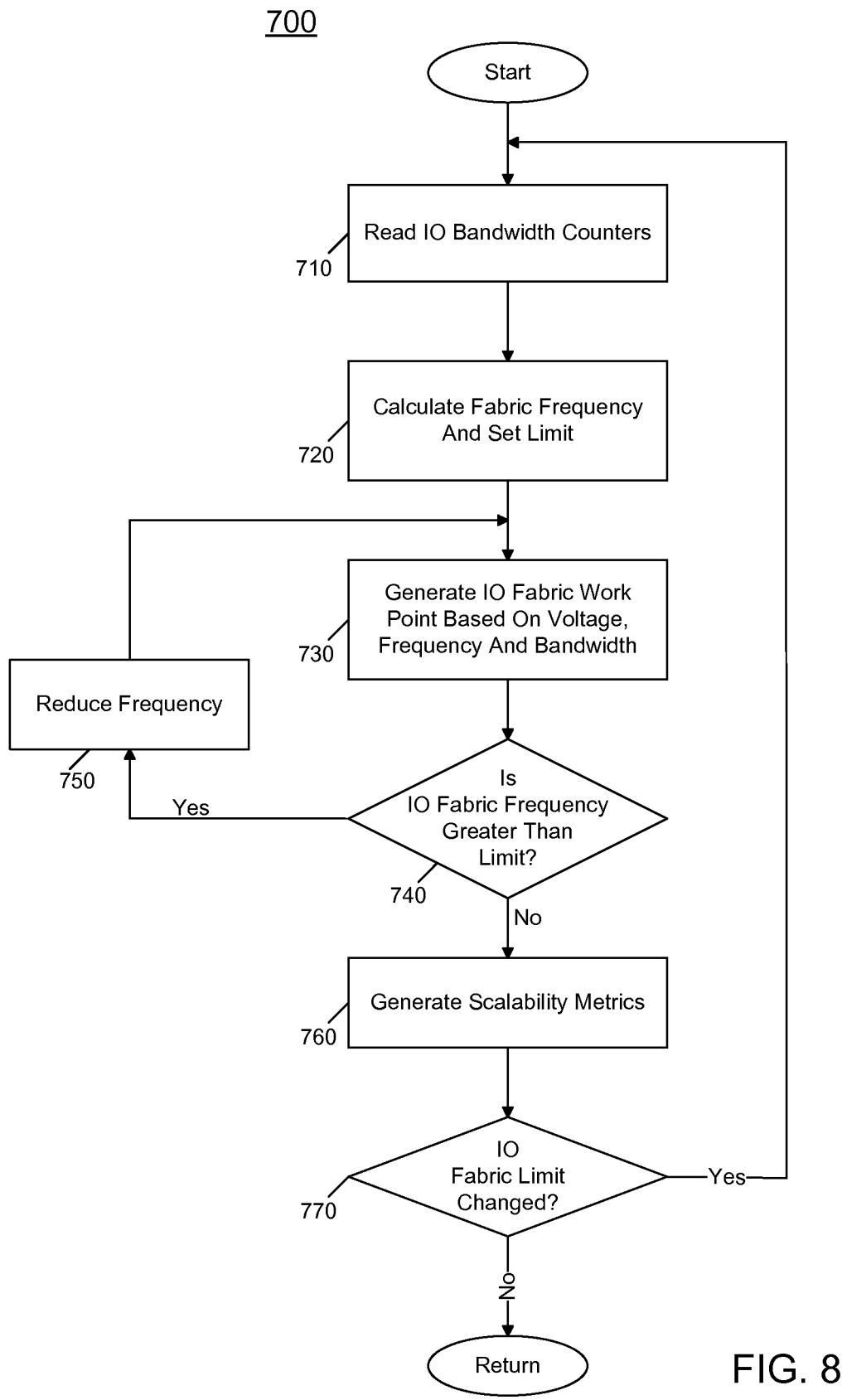
FIG. 8 is a flow diagram of a method in accordance with another embodiment of the present invention.

Referring now to FIG. 8, shown is a flow diagram of a method for optimizing an IO subsystem of a system agent in accordance with an embodiment of the present invention. As seen in FIG. 8, method 700 begins at block 710 by reading IO bandwidth counters. These counters may indicate a level of IO bandwidth for the system agent. Based at least in part on this information, control passes to block 720 where a required frequency may be calculated and a corresponding limit may be set for an IO domain of the system agent. Then at block 730, a system agent IO work point may be generated based on a corresponding voltage/frequency/bandwidth. As an example, for a particular bandwidth and fabric frequency, a corresponding IO frequency is calculated.

Still referring to FIG. 8, next at diamond 740 it can be determined whether the frequency of the IO domain is greater that the calculated limit. If so, control passes to block 750 where the frequency of the system agent may be reduced. Otherwise, control passes to block 760 where one or more scalability metrics may be generated. In an embodiment, such scalability metrics may include stall cycle counts, number of outstanding transactions in the queues, the inter-arrival rate of the read/write mix in the type of transactions and so forth. Finally, at diamond 770 it can be determined whether the IO limit is changed based on these scalability metrics. If so, control passes back to block 710 discussed above. Otherwise the optimization algorithm may conclude.

With a fixed fabric voltage and frequency, a design is proactive (platform power delivery is over-designed to ensure operation at worst-case thermals and max Icc) or reactive (throttling compute engines to limit power, resulting in large performance degradation). By using fabric scaling in accordance with an embodiment of the present invention, the dynamic operation point may be moved to different levels based on system constraints. As such, a system does not pay the power penalty of over design or the performance impact of duty-cycle thermal throttling.

Referring now to Table 1, shown is pseudocode of an algorithm for flow control in performing fabric DVFS, which generally tracks the operations described above for method 700 of FIG. 8:

TABLE 1

```
proc sa_dvfs_routine( ) {
    // collect the performance requests
    call compute_agents_pstate_req
    call device_pstate_req
    call io_subsys_pstate_req
    // collect system metrics
    // core, graphics, sa ddr bw read/write counters
    call gather_sapm_counters
    // calculate c0 cycles, stall cycles, efficiency metrics,
    BW/IO limited cases
    // get EC/PMIC, Battery Limits, VR Icc, Therm data
    call read_pmic_ec_counters
    call read_qos_settings
    // calculate & set limits based on system QoS
    // set the most optimal WP
    // find the max perf request
    Sa_pst_max = max(core, graphics, device)
    // find the required mem speed
    Sa_ddr_freq = fn(sa_pst_max, bw_ctr, stall_cycles)
    // enforce the PMIC, IO limits
    Sa_wp_target = fn(sa_ddr_freq, power, thermal, icc)
    //throttle IO sub system
    Sa_ioss_limit = fn(sa_wp_target, icc_limit, ddr_bw, IO_bw)
    Sa_wp_voltage = lookup_vf(sa_wp_target)
    // set the new WP
    If (current_WP <> target_WP) {
    Call set_sa_dvfs_wp
    }
}
```

Embodiments enable reductions of the performance impact of running into a critical condition when the battery is low or battery thermals are high. Heuristics determine whether scaling the fabric to a higher operating point is energy efficient or not, e.g., based on whether a workload is memory bound or compute bound.

Figure 9:
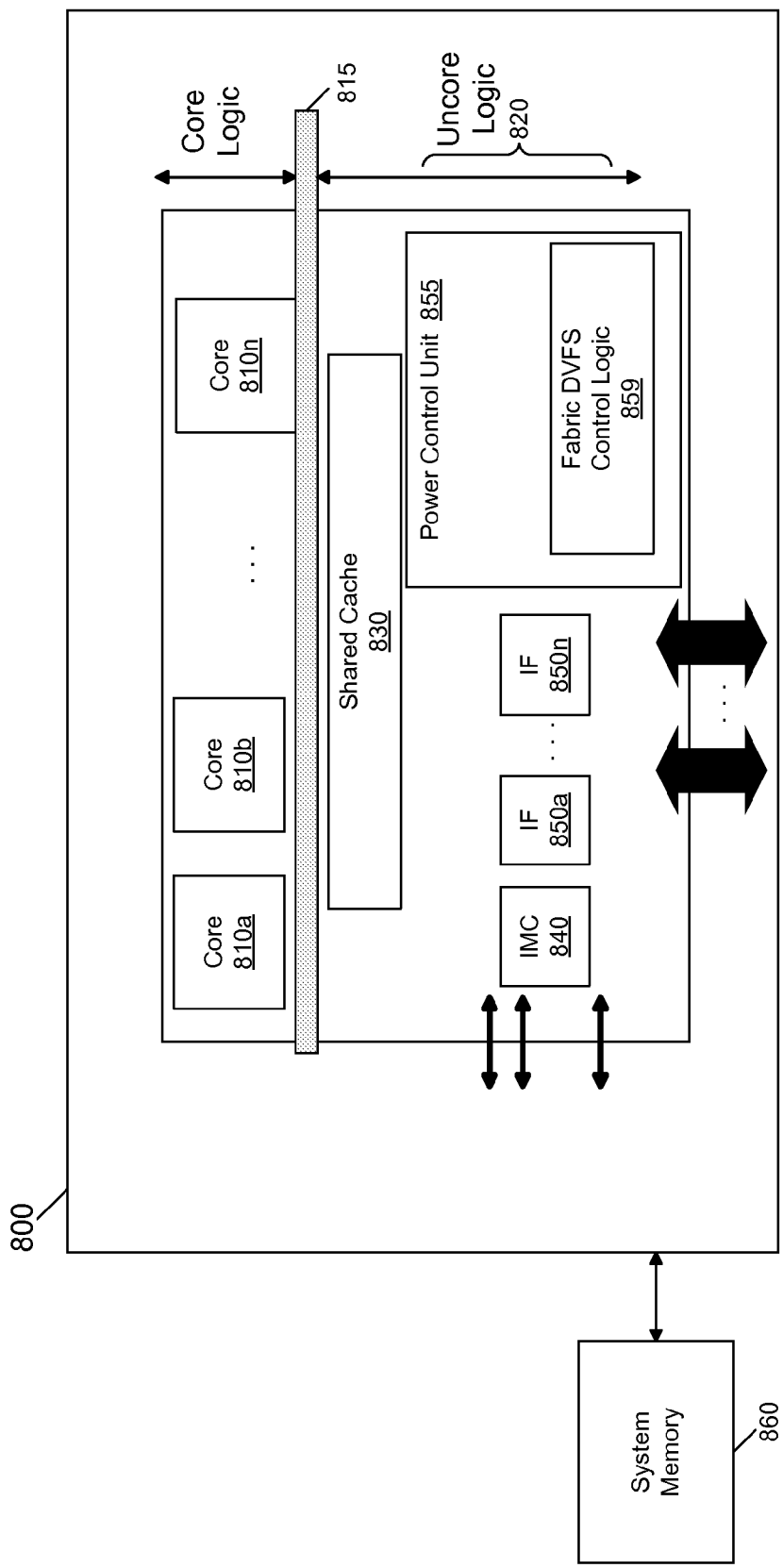
FIG. 9 is a flow diagram of a method for optimizing an IO subsystem of a system agent in accordance with an embodiment of the present invention.

Referring now to FIG. 9, shown is a block diagram of a processor in accordance with an embodiment of the present invention. As shown in FIG. 9, processor 800 may be a multicore processor including a plurality of cores 810a-810n. In one embodiment, each such core may be of a single domain or an independent power domain and can be configured to enter and exit active states and/or turbo modes based on workload. The various cores may be coupled via an interconnect 815 to a system agent or uncore 820 that includes various components. As seen, the uncore 820 may include a shared cache 830 which may be a last level cache. In addition, the uncore may include an integrated memory controller 840, various interfaces 850 and a power control unit 855. In various embodiments, power control unit 855 may include a fabric DVFS control logic 859 in accordance with an embodiment of the present invention. As described above, this logic is configured to enable independent V/F control of multiple domains of the uncore based on configuration information, activity information, environmental information, and heuristics.

With further reference to FIG. 9, processor 800 may communicate with a system memory 860, e.g., via a memory bus. In addition, by interfaces 850, connection can be made to various off-chip components such as peripheral devices, mass storage and so forth. While shown with this particular implementation in the embodiment of FIG. 9, the scope of the present invention is not limited in this regard.

Figure 10:
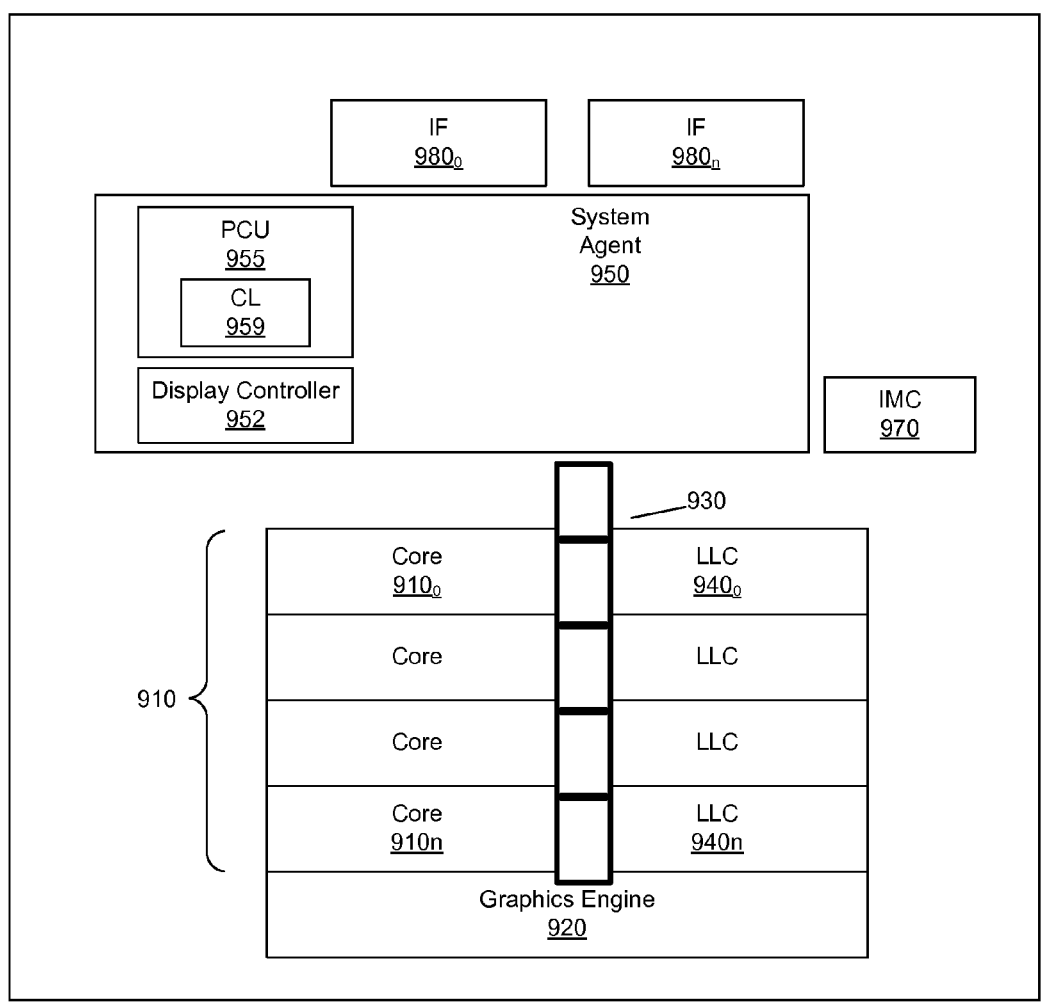
FIG. 10 is a block diagram of a multi-domain processor in accordance with another embodiment of the present invention.

Referring now to FIG. 10, shown is a block diagram of a multi-domain processor in accordance with another embodiment of the present invention. As shown in the embodiment of FIG. 10, processor 900 includes multiple domains. Specifically, a core domain 910 can include a plurality of cores $910_0$-$910_n$ and a graphics domain 920 can include one or more graphics engines. In addition, a system agent domain 950 may further be present. Each domain may be powered by an independent rail, in one embodiment. In some embodiments, system agent domain 950 may handle power control events and power management such that domains 910 and 920 can be controlled to dynamically enter into and exit high power and low power states. Note that while only shown with these overall domains, understand the scope of the present invention is not limited in this regard and additional domains can be present in other embodiments. For example, multiple core domains may be present each including at least one core.

In general, each core 910 may further include low level caches in addition to various execution units and additional processing elements. In turn, the various cores may be coupled to each other and to a shared cache memory formed of a plurality of units of a last level cache (LLC) $940_0$-$940_n$. In various embodiments, LLC 940 may be shared amongst the cores and the graphics engine, as well as various media processing circuitry. As seen, a ring interconnect 930 thus couples the cores together, and provides interconnection between the cores, graphics domain 920 and system agent circuitry 950. In one embodiment, interconnect 930 can be part of the core domain. However in other embodiments the ring interconnect can be of its own domain.

As further seen, system agent domain 950 may include display controller 952 which may provide control of and an interface to an associated display. As further seen, system agent domain 950 may include a power control unit 955 which can include a DVFS control logic 959 in accordance with an embodiment of the present invention to enable dynamic control of V/F of one or more independent domains of the system agent.

As further seen in FIG. 10, processor 900 can further include an integrated memory controller (IMC) 970 that can provide for an interface to a system memory, such as a dynamic random access memory (DRAM). Multiple interfaces $980_0$-$980_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 10, understand the scope of the present invention is not limited in this regard.

Figure 11:
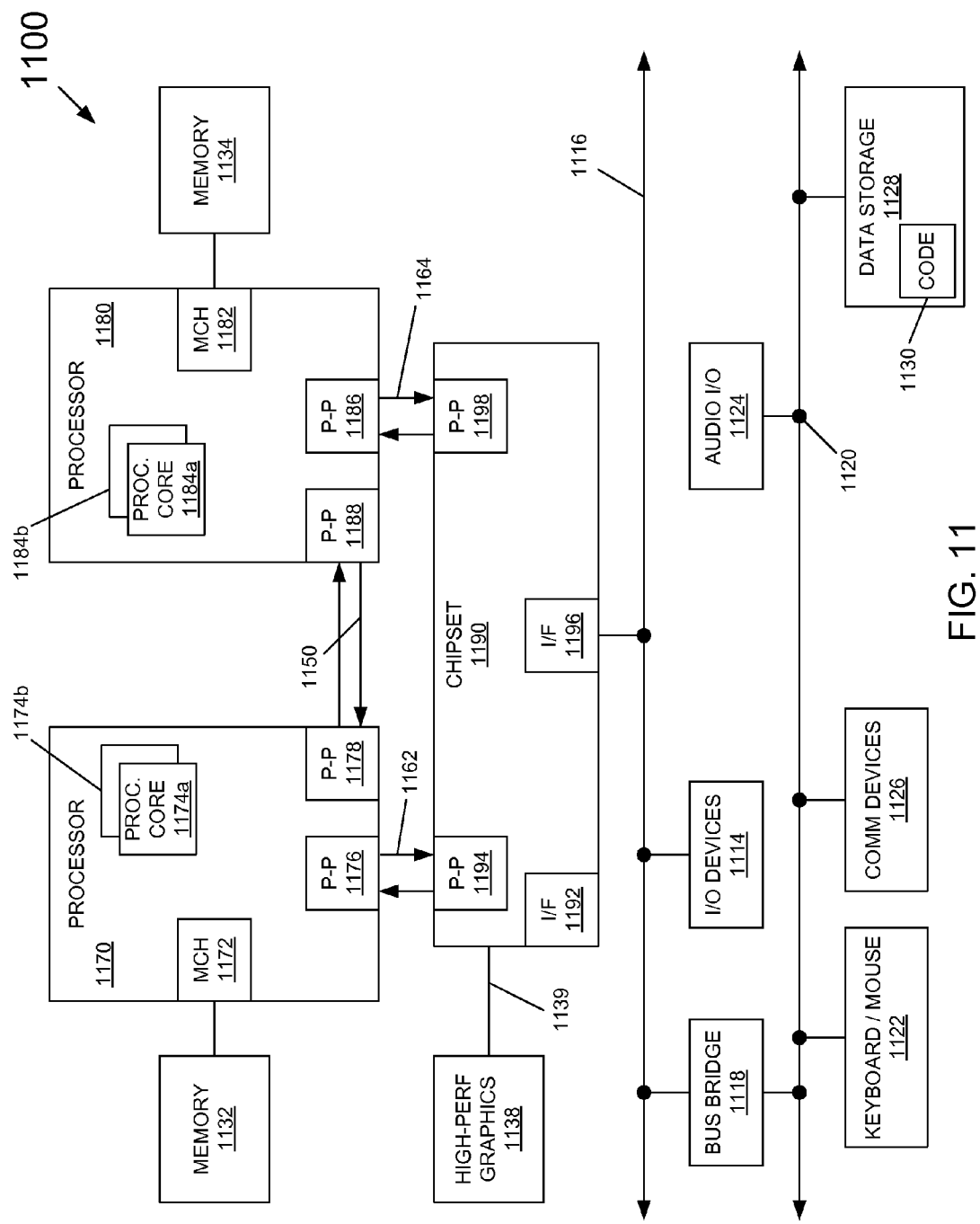
FIG. 11 is a block diagram of a system in accordance with an embodiment of the present invention.

Embodiments may be implemented in many different system types. Referring now to FIG. 11, shown is a block diagram of a system in accordance with an embodiment of the present invention. As shown in FIG. 11, multiprocessor system 1100 is a point-to-point interconnect system, and includes a first processor 1170 and a second processor 1180 coupled via a point-to-point interconnect 1150. As shown in FIG. 11, each of processors 1170 and 1180 may be multicore processors, including first and second processor cores (i.e., processor cores 1174a and 1174b and processor cores 1184a and 1184b), although potentially many more cores may be present in the processors. Each of the processors can include a PCU or other logic to perform fabric DVFS control, as described herein.

Still referring to FIG. 11, first processor 1170 further includes a memory controller hub (MCH) 1172 and point-to-point (P-P) interfaces 1176 and 1178. Similarly, second processor 1180 includes a MCH 1182 and P-P interfaces 1186 and 1188. As shown in FIG. 11, MCH's 1172 and 1182 couple the processors to respective memories, namely a memory 1132 and a memory 1134, which may be portions of system memory (e.g., DRAM) locally attached to the respective processors. First processor 1170 and second processor 1180 may be coupled to a chipset 1190 via P-P interconnects 1162 and 1164, respectively. As shown in FIG. 11, chipset 1190 includes P-P interfaces 1194 and 1198.

Furthermore, chipset 1190 includes an interface 1192 to couple chipset 1190 with a high performance graphics engine 1138, by a P-P interconnect 1139. In turn, chipset 1190 may be coupled to a first bus 1116 via an interface 1196. As shown in FIG. 11, various input/output (I/O) devices 1114 may be coupled to first bus 1116, along with a bus bridge 1118 which couples first bus 1116 to a second bus 1120. Various devices may be coupled to second bus 1120 including, for example, a keyboard/mouse 1122, communication devices 1126 and a data storage unit 1128 such as a disk drive or other mass storage device which may include code 1130, in one embodiment. Further, an audio I/O 1124 may be coupled to second bus 1120. Embodiments can be incorporated into other types of systems including mobile devices such as a smart cellular telephone, tablet computer, netbook, Ultrabook™, or so forth.

The following examples pertain to further embodiments.

In one embodiment, a processor includes at least one core to execute instructions, at least one agent to perform an operation independently of the at least one core, a fabric to couple the at least one core and the at least one agent, where the fabric includes a plurality of domains and a logic to receive isochronous parameter information from the at least one agent and environmental information of a platform including the processor and to generate first values and second values. The processor further includes a power controller to control a frequency of the plurality of domains based at least in part on the first values and the second values.

In an embodiment, the logic includes a first controller to receive the environmental information and configuration information and to generate the first values based at least in part thereon. The logic may further include a second controller to receive the isochronous parameter information and performance state information and to generate the second values based at least in part thereon. The power controller may set a first comparison value to a maximum of the first and second values and set a second comparison value to a minimum of the first and second values.

In an embodiment, the power controller is to cause a decrease in a frequency of at least one of the plurality of domains if a current work point value is greater than the first comparison value and cause an increase in the frequency if the current work point value is less than the second comparison value. The power controller may cause the frequency of the at least one domain to be decreased and thereafter cause a voltage of the at least one domain to be decreased.

Also, prior to causing the frequency decrease, the power controller may cause the at least one core to be quiesced, a first portion of the fabric to be frozen, a plurality of buffers to be stopped, and a memory coupled to the processor to be placed in a self-refresh mode. And, after causing the frequency decrease, the power controller may cause the memory to exit the self-refresh mode, the plurality of buffers to be updated to a new frequency and to be enabled, the first portion of the fabric to be unfrozen, and the at least one core to be enabled.

In an embodiment, the environmental information includes battery charge information for a battery of the platform, thermal information for the platform, and/or a voltage level of the platform received from a power management controller of the platform. The power controller may cause a reduction in an operating voltage of at least one of the plurality of domains of the fabric when the voltage level of the platform is less than a first threshold. This first threshold is above a second threshold at which the power management controller is to execute a platform level power management operation, and the operating voltage reduction is to prevent the power management controller from execution of the platform level power management operation.

In an embodiment, the plurality of domains includes a first domain to interface with the at least one core, a second domain to interface with the at least one agent, and a memory domain to interface with a memory coupled to the processor.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another embodiment, a machine-readable medium has stored thereon instructions, which if performed by a machine cause the machine to perform a method including collecting first values from a first logic of a system agent of a processor and collecting second values from a second logic of the system agent, generating a first comparison value and a second comparison value based on the first values and the second values, determining whether a work point for a first domain of the system agent is greater than the first comparison value and if so reducing the work point, and determining whether the work point is less than the second comparison value and if so increasing the work point, where the work point for the first domain of the system agent is controlled independently of a work point for a second domain of the system agent.

The method further includes quiescing a plurality of cores of the processor, freezing an input/output (IO) interface of the system agent, stopping a plurality of clock crossing buffers coupled between the plurality of cores and the system agent, and causing a memory coupled to the processor to be placed in a self-refresh state. And the method further includes thereafter performing a change to at least one of a frequency and a voltage of the first domain.

In an embodiment, the method further includes after performing the change: causing the memory to exit the self-refresh state; enabling the plurality of clock crossing buffers at an updated frequency; unfreezing the IO interface; and enabling the plurality of cores. Still further in an embodiment, the method further includes: calculating the first values based on environmental information and configuration information; and calculating the second values based on isochronous parameter information of a device of the processor and performance state information for at least one core of the processor.

In an embodiment, an apparatus comprises means to perform a method as described above. And a machine-readable storage medium including machine-readable instructions may, when executed, implement a method or realize an apparatus as described above.

In yet a further embodiment, a system includes a multicore processor including at least one core, a coherent fabric coupled to the at least one core via a first clock crossing buffer, at least one agent and a non-coherent fabric coupled to the coherent fabric and the at least one agent via a first buffer, where the coherent fabric includes a plurality of domains each to be dynamically controlled to operate at an independent voltage/frequency work point based on performance metrics of the system, and a dynamic random access memory (DRAM) coupled to the multicore processor via a memory controller of the coherent fabric.

In an embodiment, a logic is to receive isochronous parameter information from the at least one agent and environmental information of the system and to generate first values and second values therefrom and a power controller is to control the work point of the plurality of domains based at least in part on the first values and the second values. The logic includes a first controller to receive the environmental information and configuration information and to generate the first values based at least in part thereon, and a second controller to receive the isochronous parameter information and performance state information of the at least one core and to generate the second values based at least in part thereon.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    at least one core to execute instructions;
    at least one agent to perform an operation independently of the at least one core;
    a communication fabric comprising a cache coherent on-die interconnect to couple the at least one core and the at least one agent, the communication fabric including a plurality of domains and a logic to receive isochronous parameter information from the at least one agent and environmental information of a platform including the processor and to generate first values based at least in part on the environmental information and second values based at least in part on the isochronous parameter information, the isochronous parameter information comprising a deadline value for a data request; and
    a power controller to independently control a frequency of the plurality of domains of the communication fabric based at least in part on the first values and the second values.

2. The processor of claim 1, wherein the logic includes a first controller to receive the environmental information and configuration information and to generate the first values based at least in part thereon.

3. The processor of claim 2, wherein the logic includes a second controller to receive the isochronous parameter information and performance state information and to generate the second values based at least in part thereon.

4. The processor of claim 3, wherein the power controller is to set a first comparison value to a maximum of the first and second values and to set a second comparison value to a minimum of the first and second values.

5. The processor of claim 4, wherein the power controller is to:
    cause a decrease in a frequency of at least one of the plurality of domains if a current work point value is greater than the first comparison value; and
    cause an increase in the frequency if the current work point value is less than the second comparison value.

6. The processor of claim 5, wherein the power controller is to cause the frequency of the at least one domain to be decreased and to thereafter cause a voltage of the at least one domain to be decreased.

7. The processor of claim 5, wherein prior to causing the frequency decrease, the power controller is to cause the at least one core to be quiesced, a first portion of the communication fabric to be frozen, a plurality of buffers to be stopped, and a memory coupled to the processor to be placed in a self-refresh mode.

8. The processor of claim 7, wherein after causing the frequency decrease, the power controller is to cause the memory to exit the self-refresh mode, the plurality of buffers to be updated to a new frequency and to be enabled, the first portion of the communication fabric to be unfrozen, and the at least one core to be enabled.

9. The processor of claim 1, wherein the environmental information includes battery charge information for a battery of the platform.

10. The processor of claim 9, wherein the environmental information includes thermal information for the platform.

11. The processor of claim 9, wherein the environmental information includes a voltage level of the platform received from a power management controller of the platform, and wherein the power controller is to cause a reduction in an operating voltage of at least one of the plurality of domains of the communication fabric when the voltage level of the platform is less than a first threshold.

12. The processor of claim 11, wherein the first threshold is above a second threshold at which the power management controller is to execute a platform level power management operation, wherein the operating voltage reduction is to prevent the power management controller from execution of the platform level power management operation.

13. The processor of claim 1, wherein the plurality of domains includes a first domain to interface with the at least one core, a second domain to interface with the at least one agent, and a memory domain to interface with a memory coupled to the processor.

14. A non-transitory machine-readable medium having stored thereon instructions, which if performed by a machine cause the machine to perform a method comprising:
    calculating first values, in a first logic of a coherent fabric comprising a cache coherent on-die interconnect of a processor, based on environmental information and configuration information;
    calculating, in a second logic of the coherent fabric, second values based on isochronous parameter information of a device of the processor and performance state information for at least one core of the processor, the isochronous parameter information comprising a deadline value for a data request;
    collecting the first values from the first logic of the coherent fabric and collecting the second values from the second logic of the coherent fabric;
    generating a first comparison value and a second comparison value based on the first values and the second values;
    determining whether a work point for a first domain of the coherent fabric is greater than the first comparison value and if so reducing the work point; and
    determining whether the work point is less than the second comparison value and if so increasing the work point, wherein the work point for the first domain of the coherent fabric is controlled independently of a work point for a second domain of the coherent fabric.

15. The non-transitory machine-readable medium of claim 14, wherein the method further comprises:
    quiescing a plurality of cores of the processor;
    freezing an input/output (IO) interface of the coherent fabric;
    stopping a plurality of clock crossing buffers coupled between the plurality of cores and the coherent fabric; and
    causing a memory coupled to the processor to be placed in a self-refresh state.

16. The non-transitory machine-readable medium of claim 15, wherein the method further comprises thereafter performing a change to at least one of a frequency and a voltage of the first domain.

17. The non-transitory machine-readable medium of claim 16, wherein the method further comprises after performing the change:
- causing the memory to exit the self-refresh state;
- enabling the plurality of clock crossing buffers at an updated frequency;
- unfreezing the IO interface; and
- enabling the plurality of cores.

18. A system comprising:
- a multicore processor including at least one core, a coherent fabric coupled to the at least one core to communicate transactions via a first clock crossing buffer of the at least one core, at least one agent and a non-coherent fabric coupled to the coherent fabric and the at least one agent to communicate transactions via a first buffer of the at least one agent, wherein the coherent fabric includes a plurality of domains each to be dynamically controlled to operate at an independent voltage/frequency work point based on performance metrics of the system, the coherent fabric comprising a logic to receive isochronous parameter information from the at least one agent and environmental information of the system and to generate first values and second values therefrom, the isochronous parameter information comprising a deadline value for a data request associated with a device isochronous requirement;
- a power controller to control the work point of the plurality of domains based at least in part on the first values and the second values, wherein the first values are to be generated at a first rate and the second values are to be generated at a second rate; and
- a dynamic random access memory (DRAM) coupled to the multicore processor via a memory controller of the coherent fabric.

19. The system of claim 18, wherein the logic includes a first controller to receive the environmental information and configuration information and to generate the first values based at least in part thereon.

20. The system of claim 19, wherein the logic includes a second controller to receive the isochronous parameter information and performance state information of the at least one core and to generate the second values based at least in part thereon.

* * * * *